United States Patent
Schneider

[15] 3,685,933
[45] Aug. 22, 1972

[54] APPARATUS FOR PRODUCING AN ASSEMBLY OF INTERCONNECTED AND RELATIVELY MOVABLY DISPLACEABLE MOLDED PARTS

[72] Inventor: Helmut E. Schneider, Mainz, Rhine, Germany

[73] Assignee: Firma Werner & Mertz GmbH, Mainz, Rhine, Germany

[22] Filed: Nov. 13, 1969

[21] Appl. No.: 876,500

[30] Foreign Application Priority Data

Nov. 16, 1968   Germany..........P 18 09 317.9

[52] U.S. Cl. ................425/109, 264/328, 425/250, 425/297
[51] Int. Cl. .....................B29c 25/00, B29c 27/00
[58] Field of Search ..18/30 PM, 30 WN, 34 R, 42 R, 18/DIG. 35; 264/334, 242; 29/235, 451; 222/92; 249/68

[56] References Cited

UNITED STATES PATENTS

| | | | |
|---|---|---|---|
| 2,778,533 | 1/1957 | Savary | 222/92 |
| 3,013,308 | 12/1961 | Armour | 29/451 |
| 3,477,095 | 11/1969 | Lensky | 264/334 X |

*Primary Examiner*—R. Spencer Annear
*Attorney*—McGlew and Toren

[57] ABSTRACT

A method of producing plastic articles which are assembled from a plurality of parts produced by injection into a mold includes forming the parts in mold cavities providing web portions for interconnecting the molded parts and holding them in an orientation from which they can be easily assembled and thereafter joining the molded parts together by moving them into juxtaposition while severing the connecting webs either when they are still in the mold or when they are removed from the mold. The molding apparatus advantageously includes, in one embodiment, a first molding cavity for one of the parts and a working plate forming cavities for one or more additional parts at locations spaced from the first cavity and providing a joining connection between the first cavity and the additional cavities for the other parts. The work plate is movable to present each additional part in succession into alignment with the molded part of the first cavity so that they can be pushed into the first molded part by suitable movable elements. In an alternate construction two or more separate mold parts are formed such that they provide means for molding individual parts in axial alignment. The construction is such that a mold cavity is defined which provides for a formation of an aligning shaft member which is first positioned through a bore of each of the parts after they are molded to hold them in proper orientation and thereafter these parts are moved together axially to place them into juxtaposition.

3 Claims, 10 Drawing Figures

INVENTOR
HELMUT SCHNEIDER

BY
McGlew & Toren
ATTORNEYS

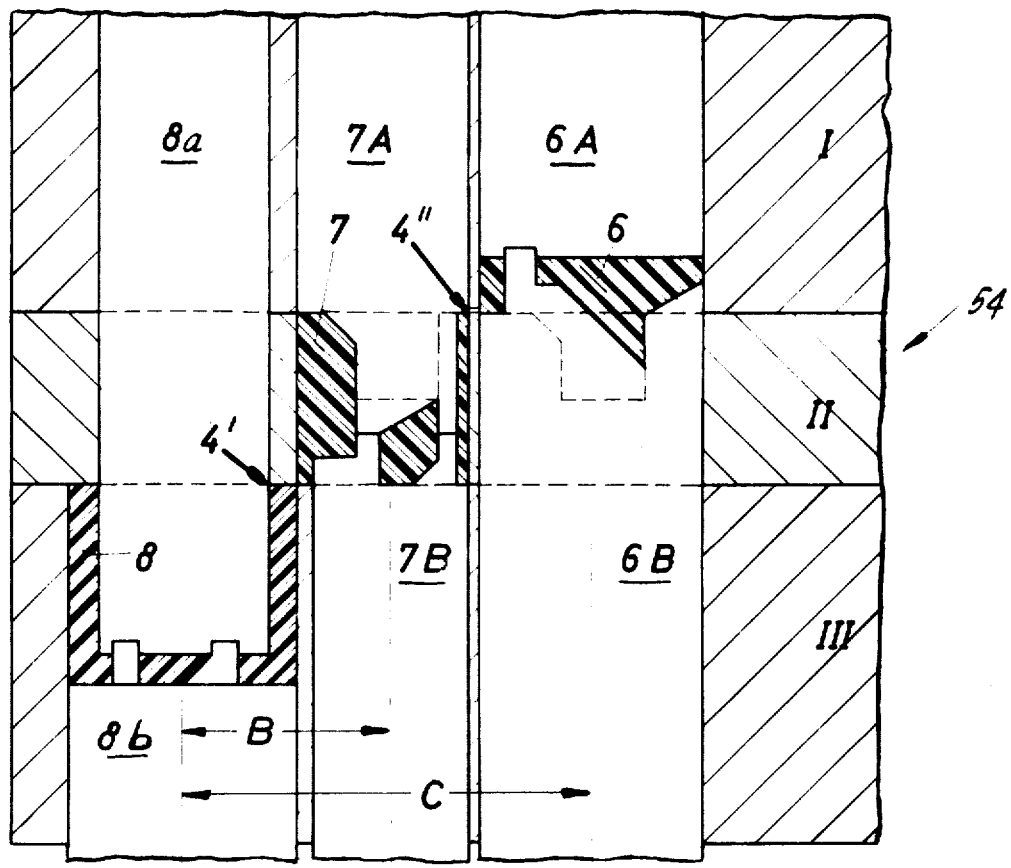
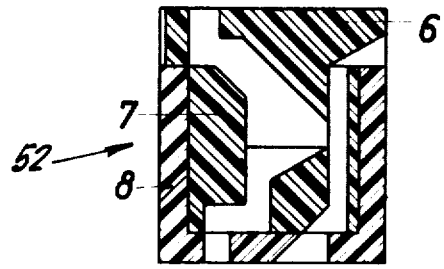
Fig. 4
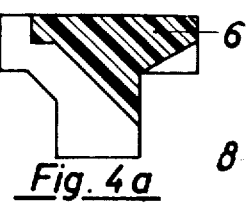
Fig. 4a
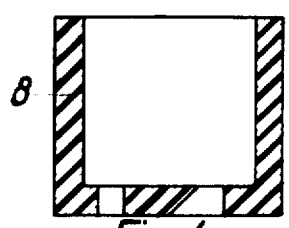
Fig. 4c
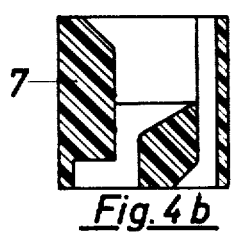
Fig. 4b
INVENTOR
HELMUT SCHNEIDER

INVENTOR
HELMUT SCHNEIDER

BY
McGlew & Toren
ATTORNEYS

APPARATUS FOR PRODUCING AN ASSEMBLY OF INTERCONNECTED AND RELATIVELY MOVABLY DISPLACEABLE MOLDED PARTS

SUMMARY OF THE INVENTION

This invention relates in general to an apparatus and method for forming a plurality of separate molded parts of articles which include as assembly of such parts and in particular, to a new and useful method and apparatus for forming a plurality of molded parts which are interconnected so that they may be formed of the same molding material and which may be moved into a nested assembly either while still in the mold or shortly thereafter.

In the fluid or plastic injection process for molding articles such as those made from resilient plastic materials only specific shaping requirements can be met when the article is injection molded in one piece. A limiting factor on the types of molded articles and their particular shapes is the construction of the mold in a manner which permits the ejection of the molded article without damaging it. However, a number of shaping requirements and functional requirements can be carried out if the finished article is made up of an assembly of individual molded components. If, for example, a finished article is to have a plurality of parts which are slidable relative to each other then such assembly from separate components is indispensible. This usually results in increased tooling costs and in many cases very considerable extra expenditures for assembly. When the parts are made separately the finished components have to be isolated before assembly and placed in a specific position relative to one another. This entails a highly complex and expensive apparatus for each component. The mutual alignment of the individual parts is particularly difficult and expensive, especially when the parts can be joined together only if they are arranged in a definite angular relationship as for example in the case of cylindrical parts containing one or more apertures or passages which must be aligned with one or more other passages and which do not define any rotational symmetry. With such parts apparatus is required for separating and aligning each component and also for joining the components together in a precise orientation.

The present invention provides a method for producing plastic articles which are assembled from a plurality of injection molded parts by an apparatus and method of forming the parts within a same mold in an orientation in which one part may be easily directed into the other part after molding either within the molding apparatus or shortly after removal therefrom, the arrangement and method permits the formation of an assembly of molded parts without requiring expensive aligning and assembly apparatus.

In the preferred form of the invention the individual parts of the plastic article are molded in closely adjacent cavities of a mold having a form with interconnections of mold material to facilitate the complete molding of the whole assembly in a single operation. In addition, in a preferred arrangement, the individual parts are molded so that they may be easily pressed into an assembled condition either directly or after first shifting a working plate of the mold cavity so as to align one or more parts with a first molded part.

In accordance with a feature of the invention the individual parts are molded in a predetermined orientation so that the parts receive a specific position relative to one another during or after their formation in the mold. This relative position which is determined by the construction of the molds in a relative arrangement is set in a most advantageous manner to provide for both the molding of the parts and the rapid assembly after molding either within the mold or directly after they have been removed therefrom. The arrangement and method is such that the separation and the alignment of the parts which had to be carried out before the parts could be joined can be eliminated.

The invention finds particular application for molding more than one part of the same material and this is accomplished, in accordance with the present invention, by connecting the individual parts by connecting passages located in the mold cavity which permit the formation of joining webs that are severed when the parts are to be interconnected or joined. The connecting webs are advantageously arranged in a plane which permits the easy separation of one part from the other and preferably this separation facilitates the shifting of the parts relatively so that they may fall in place one within the other in proper orientation. The joining of the individual parts can be accomplished before they have completely hardened, or when they are still partly in a plastic state, particularly when a strong joint between the components is required. This is particularly advantageous, for example, when the parts are to be connected by snap type joints using the elasticity of the parts for interconnection. The method and construction of the mold of the present invention make it possible to form the parts as separate elements interconnected by mold material and then by severing the connection between these parts and immediately displacing one within the other even while they are still within the mold if so desired. A particular advantage of the arrangement is that the exact relative position of the parts is determined by the molding process itself. In one embodiment the molded parts are formed in two separate planes and one part is pushed into the other part with which it is aligned during the injection molding process. In still another construction, the mold may comprise a working plate forming a mold cavity for one part which is formed at a location spaced from the part into which it is to be inserted but which can be displaced laterally immediately after formation to position the part in proper orientation for insertion into the first part. Two or more molded parts may also be made in an axially aligned position within the mold cavity and joined together by webs and the parts may be held in a proper orientation by the insertion of a further plastic molded part until they are assembled by pressure applied in the axial direction to move them into proper assembled relationship.

Accordingly, it is an object of the invention to provide an improved method for producing articles which are adapted to be assembled together which includes molding the articles in a manner such that one part is interconnected with the other part by a thin web of molded material and thereafter inserting the one part into the other part after the molding operation is completed.

A further object of the invention is to provide a method of forming a plurality of molded parts which are to be assembled together which includes molding all of the parts in a single molding device wherein the parts are either advantageously aligned and interconnected by web elements which orient them in proper alignment or they are molded and spaced at lateral locations in a working plate of the mold which may be shifted to sever the web connections and position the parts in orientation for assembly one within the other.

A further object of the invention is to provide a device for molding parts which includes a mold cavity comprising at least one first means defining a receiving molded part, a second movable cavity plate member defining at least one second molded part and advantageously one or more mold elements defining a third molding part which may be displaced into the working plate, the working plate movable to shift the second molded part and thereafter any more molded parts which have been formed successively in alignment with the first molded part for the assembly of these parts to the first molded part.

A further object of the invention is to provide a device for molding a plurality of parts which are adapted to be assembled together and which is simple in design, rugged in construction and economical to manufacture.

The various features of novelty which characterize the invention are pointed out with particularity in the claims annexed to and forming a part of this specification.

For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 4 is a sectional view of an assembly of molded parts which have been formed by the apparatus and method of the invention;

FIGS. 4a, 4b and 4c are sectional views of the individual parts of the assembly indicated in FIG. 4;

FIG. 5 is a schematic sectional view of an apparatus for molding a plurality of parts which are to be assembled together in accordance with the method of the invention;

GENERAL DESCRIPTION OF THE PREFERRED EMBODIMENTS

Figure 1:
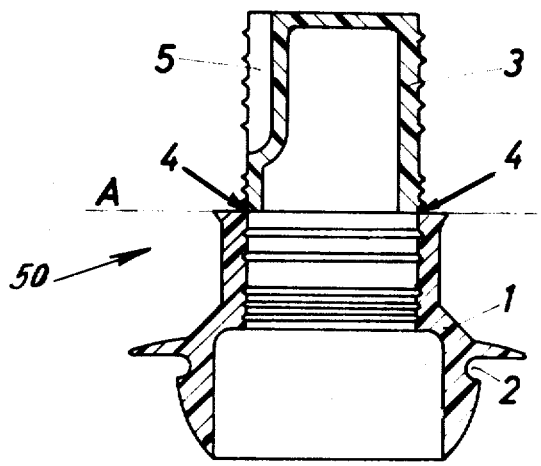
FIG. 1 is an axial sectional view of a molding formed in accordance with the method and apparatus of the invention.
Figure 2:
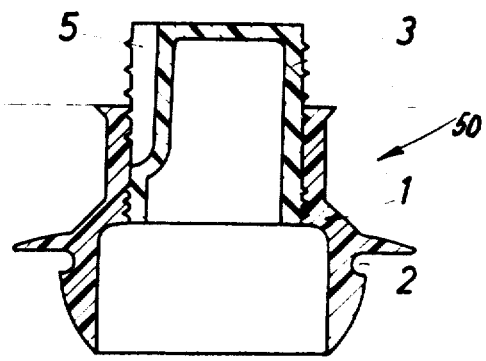
FIG. 2 is a view similar to FIG. 1 indicating one part of the molding of FIG. 1 displaced within the other part.
Figure 3:
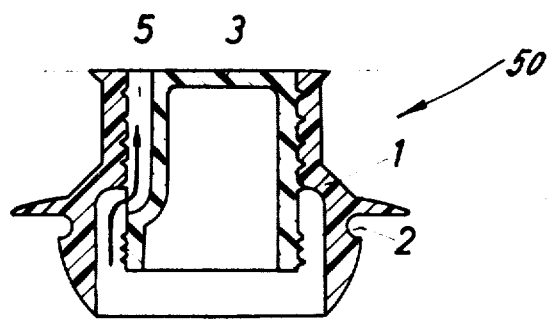
FIG. 3 is a view similar to FIG. 1 with the molded parts shown in a further condition of assembly.

Referring to the drawings in particular, the invention embodied therein deals with the formation of an assembly of individual parts of molded articles such as a two part article generally designated 50 as indicated in FIGS. 1 through 3. The article 50 is made of two portions, namely a closure portion 1 which is adapted to be snapped into a cylindrical opening of a container which is adapted to engage with its rim (not shown) in an annular groove 2. In addition, the assembly includes a stopper 3 which is adapted to be inserted into the part 1 up to the position indicated in FIG. 2 or the position indicated in FIG. 3. FIG. 1 indicates that the assembly 50 is made as a single or one piece molding as it would be formed in a mold or directly after it is removed from the mold. The part 1 is joined to the part 3 through a webbing or connecting piece at the location of the plane of contact designated by the arrow 4. This plane A shown in broken line may be formed by a single annular web interconnection 4 or by a plurality of small web-like elements. The interconnection permits the forming of the two parts 1 and 3 of the same material which may flow, for example, through the connecting passages during the molding process.

In accordance with a feature of the method of the invention the two parts are displaced relative to each other by rupturing the interconnection 4 at the point of contact either when the material is still hot and plastic as it is formed within the mold cavity or slightly thereafter or even when it is fully cooled. The portion above the plane A is pressed into the portion below the line preferably while it is still retained within the mold which is either closed or partly closed. The stopper portion 3 is advantageously pushed into the closure portion 1 to the position indicated in FIG. 2, and in such a position the whole molding, including the two parts, is ejected from the mold cavity.

When this assembly 50 is placed on a container there is no communication between the material filling the container and the outside environment. If the movable stopper 3 is pressed by hand into an end position shown in FIG. 3 then an opening is formed defining a passage 5 which communicates between the interior and the exterior of the container (not shown). The stopper indicated is such that it cannot be returned to the FIG. 2 position so that such a closure assembly 50 is a so-called pilfer proof-seal. The closure is also provided with a cap to enable it to be reclosed after it is used for the first time.

An apparatus for molding the assembly 50 indicated in FIGS. 1 through 3 would comprise a usual mold cavity defining the outlines of the two parts in the interconnection area 4 therebetween. Such a molding device would also have means for retaining the part 1 while the upper part 3 is displaced down into the part 1 and such a means in the form of a plunger (not shown) would be effective to move directly into the mold cavity itself so that the displacement can be accomplished directly after the molding operation. Advantageously, when a plunger is employed for moving the part 3 into the part 1, means in the mold cavity must be provided for withdrawing the central portion of the mold for this part as the displacement takes place.

An example of an apparatus 52, for forming a multi-part assembly, is shown in FIG. 5 and it may be operated in accordance with the method of the invention to provide a three piece assembly of parts 6, 7 and 8 as indicated in FIGS. 4, 4a, 4b, and 4c. Such a device, as indicated in FIG. 5, and it includes a molding machine generally designated 54 having first and second mold parts generally designated I and III and an intermediate shiftable working plate generally designated II. The part III defines a first cavity above a plunger member 8b and below a top plunger member 8a. The parts I and III also define a mold cavity for the part 7 together with the part II. The part 7 which is thus formed is joined to the part 8 through a connecting area 4' which extends laterally. The part 7 is molded in a cavity which is positioned above the cavity defining the part 8 and at a position in which it is laterally offset therefrom and the part configuration is formed between plunger member 7A and 7B. A third part 6 is formed so as to be connected by web elements 4" in a plane above the plane of the connecting elements 4' and adjacent the top of the part 7. The part 6 is advantageously formed between a plunger 6A and a plunger 6B between the mold cavity forming member I in the working plate II. Thus the part 6, 7 and 8 are formed integrally and may for example be made of the same molding material which may flow during the molding operation along the connecting areas 4' and 4".

When the injection process is completed and the parts 6, 7 and 8 are sufficiently hardened, the plunger 8a is moved upwardly along the plunger 7A. The plunger 7B and the plunger 6B are moved downwardly. The plunger 6A is also moved downwardly in order to position the part 6 within the cavity of the plate II. After this is done the plunger 6A is moved upwardly again. The plate II is then moved by the distance B to the left relative to the parts I and III. This distance is equal to the distance between the center lines and the parts 7 and 8. After this has been done the plunger 8a is moved downwardly to press the part 7 into the part 8. The plunger 8a is then moved upwardly again and the plate II is moved to the left by distance equivalent to the indicated distance C–B. The plunger 8a is then moved downwardly to press the part 6 into the part 7 which has already been connected to the part 8. Thus all the parts are assembled to the position indicated in Fig. 4 and in this condition the mold is then opened and the assembly 52 is ejected. In order to prepare for the next charge the plunger 8a is moved upwardly, the plate II is moved back the distance B to the right and all of the plungers 6A, 6B, 7A, 7B, and 8a, 8b are returned to their starting position.

Figure 6:
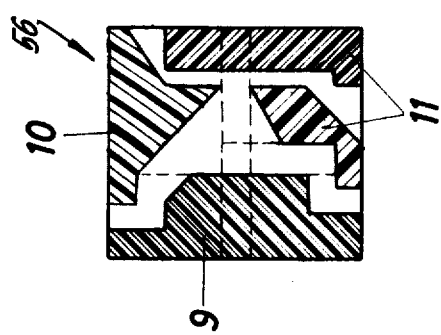
FIG. 6 is a sectional view of another assembly of molded parts.

In Fig. 6, there is indicated an assembly of parts to form a molded article assembly generally designated 56 which is made up of individually molded parts 9, 10 and 11. The parts 9, 10 and 11 are formed in a molding apparatus generally designated 58 which includes central jaws 14 and 15 which are movable together to define a mold cavity for the part 10 and portions of the parts 9 and 11 and working plates 12 and 13 which form the remaining portions of the parts 9 and 11 and also form an aligning member 18. The parts 9, 10 and 11 are molded in a position in which they are in axial alignment and aligned from the rotational standpoint for intermediate assembly. One or more plungers 16 are located outside of the mold cavity which will be filled during molding but will be oriented when the jaws 14 and 15 are opened to provide an obstruction. In the drawing guide plungers 16 are offset forwardly and backwardly out of the sectional plane illustrated. As molded, all of the parts 9, 10 and 11 are joined together by webs 4''' which are sheared off when the parts are assembled. In addition, there are two connecting webs (not shown) in planes which are above and below the sectional planes shown in the drawings. A further connecting part 4a is located between the part 11 and an aligning member 18 which is formed during the molding operation. For this purpose the work plate 13 includes a hollow slide member 17 with a plunger 19 workable in the plunger at areas corresponding to the plunger 16.

The plastic material is injected in any one place (this is not shown) and it fills all the cavities of the mold including the cavity or cavities formed between the guide plunger 16 and slides 19. This forms the guide members or assembly members 18 equal in cross-section to the slide 19.

After the molding process is finished the molding pressure between the plates 12 and 13 is withdrawn and the jaws 14 and 15 are drawn backwardly. The plastic parts which are separated from the jaws are internally threaded and they are aligned by one or more of the guide elements 18 as if they were on a string of beads. In those instances where there is only one guide member 18, it is constructed so that when it is positioned into the individual parts 9, 10 and 11, they will not rotate relative to it. However, when there are several such elements 18 they may be made cylindrical in shape since mutual rotation of the parts would be stopped in any event.

The slide 17 is advanced in the plate in order to first displace the guide elements 18 into the associated parts which thereafter displace the parts until they have reached their final position in the desired assembled article as shown in FIG. 6. The individual guide plungers 16 retreat during the insertion of the guide members 18 toward the left as indicated in the drawing and the parts 18 are pushed by the slide 19 into the desired aligning position. The guide parts 18 fulfill two functions, they fill the cavity or cavities formed by the guide core 16 and they also fix the plastic parts 9, 10 and 11 relative to each other by a nailing action. Each guide member 18 may have a diameter such that it will be subsequently put under tension in the finished component.

The guide plunger 16 also fulfills two functions. First of all, all of the plungers prevent change in the position of the plastic parts 9, 10 and 11 when the jaws 14 and 15 are open and also they provide accurate guidance for these parts when they are being pushed one into the other.

The finished assembly 56 is removed by ejectors when the whole mold has been opened and the ejector in the plate 12 is shown at 20. The connecting webs 4''' and 4a are torn off and the parts 9, 10 and 11 are pushed one into the other. They are preferably arranged and located on the several webs so that the ends left after tearing do not cause any trouble in the assembled article.

Figure 7:
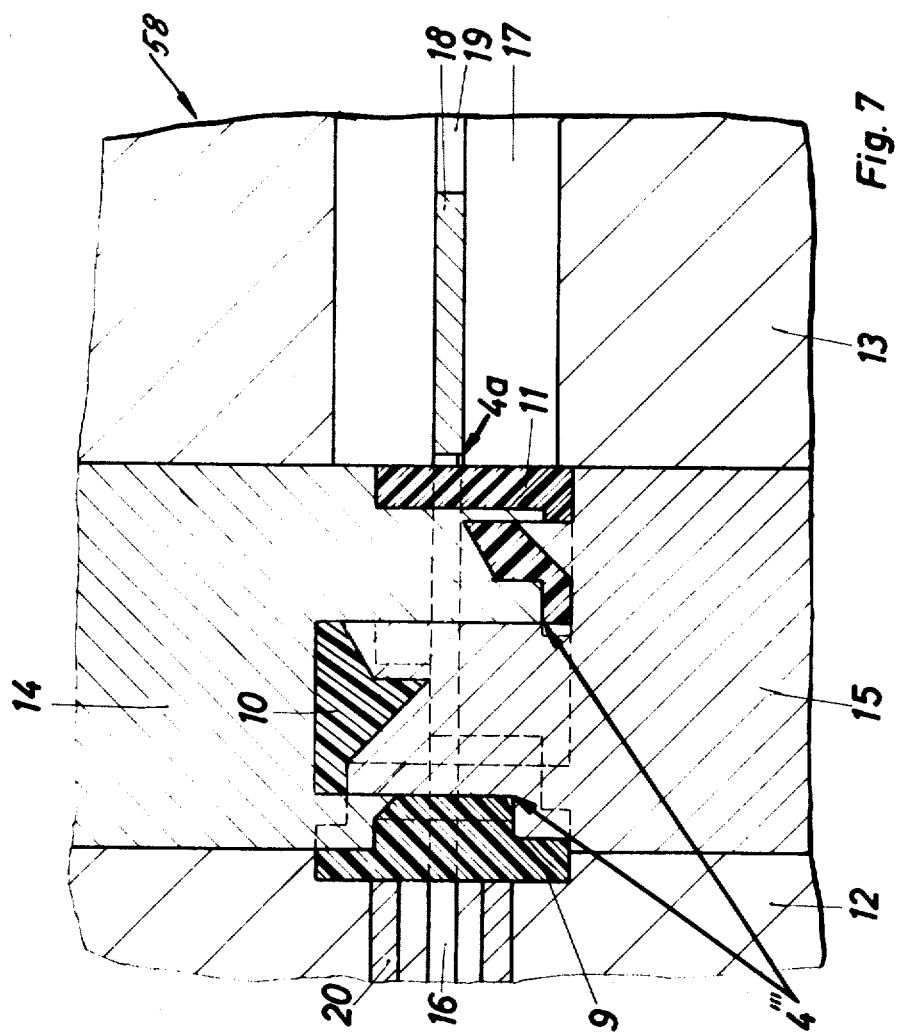
FIG. 7 is a schematic partial sectional view of another embodiment of a molding device constructed in accordance with the invention.

The three embodiments of the method of the invention are described in respect to drawings of FIGS. 1 through 3, FIGS. 4 and 5 and also FIGS. 6 and 7, respectively. The assembly of articles may be made of individual components which are made of the same plastic material. The articles may be molded in one piece and the components separated after the molding process. The method of the invention may also be applied to the production of articles in which the individual components are made of different plastic materials if so desired. In such case the components are then not necessarily connected together by webs as in the embodiment of Figs. 1 through 3, but are molded in separate mold cavities although these may be defined in a single mold. If desired, connecting webs may be made of the same or similar material in order to orient the parts for easy interconnection within or without the mold.

What is claimed is:

1. A device for molding a plurality of parts which are to be assembled together including a first mold portion defining a cavity for a first molded part, a second mold portion defining a cavity for a second molded part directly adjacent said first part and said first and second mold portions arranged for forming an interconnecting passageway therebetween so that a bridging web of molded material is provided between said first and second molded parts in the molding operation, and means in combination with said first and second mold portions for enclosing the mold cavities around said molded parts for forming of said parts by injection molding and for relatively displacing of said molded parts to shear the bridging web therebetween and to assemble said parts and further to open said cavities to release said molded parts.

2. A mold apparatus including first wall means partly defining a first cavity for a first molded part, a first and a second plunger arranged for movement in said first wall means toward and away from each other and defining therebetween and within said wall means said first cavity for the formation of said first molded part, second wall means partly defining a second mold cavity for forming a second molded part adjacent to said first molded part but laterally offset in respect thereto, said second wall means in combination with said first wall means defining a passage for a connecting web between said first molded part and said second molded part, a third and a fourth plunger movable in said second wall means toward and away from each other and defining therebetween and within said second wall means said second cavity, said third and fourth plungers being movably displaceable relative to said second cavity, and said second wall means comprises a working plate containing the lateral walls of said second wall cavity and said working plate being shiftable laterally in respect to said first mold cavity for shearing the connecting web between said first and second molded parts and for positioning said second molded part in alignment with said first molded part for assembly therewith.

3. A device, according to claim 2, wherein said working plate defines a portion of a third molded part, means in combination with said working plate defining a third cavity and including a fifth plunger movable through said working plate and an oppositely disposed sixth plunger movable in alignment therewith, said fifth plunger being retractable from said third cavity after the third part is molded, said sixth plunger being movable for displacing said third molded part from said third cavity into said working plate, and said working plate being laterally displaceable with said second and third molded parts for movement successively into alignment with said first part in said first wall means for effecting the assembly of said first, second and third molded parts together.

* * * * *